Oct. 7, 1969 M. J. BIRCK 3,471,650
TELEPHONE SIGNALING SYSTEM FOR REJECTING
SPURIOUS RINGING SIGNALS
Filed Feb. 7, 1966
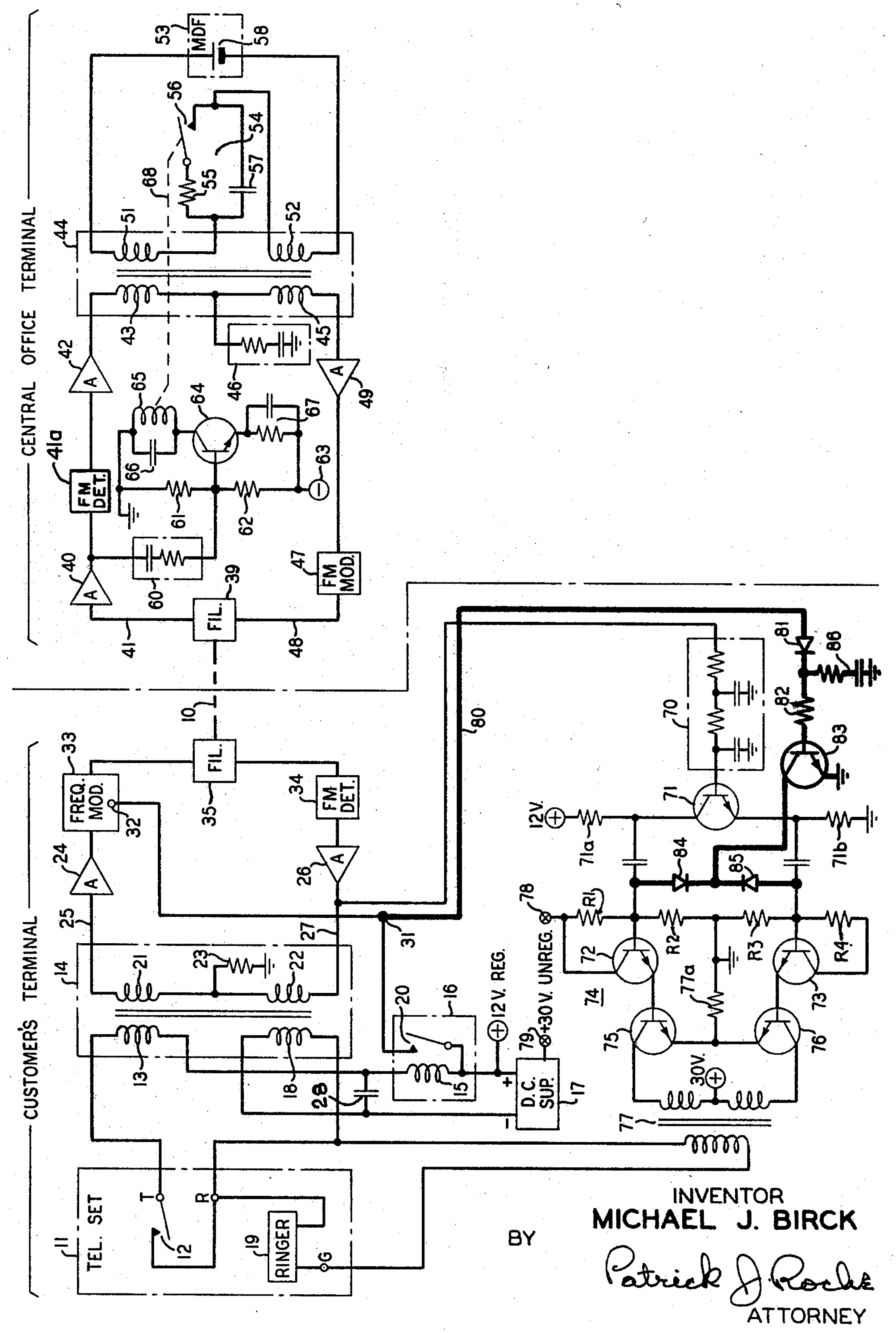
INVENTOR
MICHAEL J. BIRCK
BY
Patrick J. Roche
ATTORNEY United States Patent Office 3,471,650

Patented Oct. 7, 1969

3,471,650
TELEPHONE SIGNALING SYSTEM FOR REJECTING SPURIOUS RINGING SIGNALS

Michael J. Birck, Martinsville, N.J., assignor, by mesne assignments, to Superior Continental Corporation, a corporation of Delaware Filed Feb. 7, 1966, Ser. No. 525,650
Int. Cl. H04m 1/74
U.S. Cl. 179—84 12 Claims

ABSTRACT OF THE DISCLOSURE

A telephone system extending between a customer telephone set terminal and a central office terminal and generating transient voltages at both terminals in response to off-hook, dialing and on-hook operations of the customer telephone set to cause the production of false ringing signals thereat, including a circuit to obviate such production of false ringing signals, comprising a transistor positioned at the customer terminal and activated to saturation (low impedance) to transmit the transient voltages therethrough to ground, and an R-C network voltage charge maintaining the transistor in saturation for a predetermined time interval after the customer telephone set is operated from off-hook to on-hook to cut off saturation in the transistor (high impedance), whereby the production of false ringing signals is obviated.

This invention relates to a telephone signaling system, and more specifically to such system including an improved arrangement for nullifying the effects of spurious voltages introduced into the system in response to certain operations thereof.

The prior art is aware of telephone signaling systems comprising customers' terminals including voice and carrier frequency equipments for servicing two different customers with secrecy therebetween, a central office terminal geographically spaced from the customers' terminals and including voice and carrier frequency equipments, and a pair of conductors for transmitting voice and carrier frequency signaling voltages thereon in opposite directions at the same time between the customers' and central office terminals. In such system, at least one of the customers' terminals includes a telephone set coupled via a first hybrid coil and transmitting and receiving paths to one end of the signaling conductor pair; and the central office terminal includes a main distributing frame coupled at least via a second hybrid coil to the opposite end of the signaling conductor pair.

At such one customer's carrier terminal a common type of telephone set operable to on-hook, off-hook and dial-pulsing states is utilized to originate direct current voltage signals outgoing therefrom via the first hybrid coil to the transmitting path for transmission as carrier frequency signals on the signaling conductor pair to the central office terminal. At this terminal the carrier frequency signals derived from the signaling conductor pair are translated via the second hybrid coil into direct current voltage signals corresponding with the direct current voltage signals originated at the one customer's carrier terminal.

It was found that the operation of the telephone set at the one customer's carrier terminal from the on-hook to the off-hook state, in the dial pulsing state, and from the off-hook back to the on-hook state caused the first hybrid coil to introduce transient voltages into the receiving path at the latter customer's terminal. It was also found that the translation of the carrier frequency signals into the corresponding direct current voltage signals at the central office terminal caused the second hybrid coil thereat to apply additional transient voltages to the signaling conductor pair at the latter terminal for transmission into the receiving path at the one customer's carrier terminal. These first-mentioned and additional transient voltages actuated the telephone set ringer to produce false ringing signals.

The present invention contemplates an improved circuit arrangement for activating a telephone signaling system to nullify the effects of transient voltages introduced thereinto as a result of normal operations thereof.

In association with a telephone signaling system including a customer's carrier frequency terminal having a telephone set operable to on-hook, off-hook, and dial-pulsing states for providing indications of such states via first inductive means in corresponding carrier frequency signals applied to a pair of signaling transmission conductors for transmission thereon to a central office terminal whereat the carrier frequency signals derived from the signaling transmission line are translated via second inductive means into other indications corresponding with the first-mentioned indications, and an amplifier of the customer's carrier terminal for deriving preselected ringing signals from the signaling conductor pair so that the amplified ringing signals actuate the telephone set to produce desired ringing signals, whereby the first and second inductive means are caused to apply to the signaling conductor pair transient voltages which after amplification in the ringing amplifier actuate the telephone set to produce false ringing signals, a specific embodiment of the present invention including a transistor connected between the ringing amplifier input and ground serves to preclude such transient voltages from actuating the telephone set to produce false ringing signals. This embodiment functions in such manner that when the telephone set is operated to its on-hook state, the transistor is in the cut-off condition thereby presenting a high-impedance shunt path to ground to the ringing amplifier input so as not to impair normal ringing signal transmission. It functions further in such manner that when the transistor is activated to the saturated condition, it presents a low-impedance shunt path to ground to the ringing amplifier input so as to transmit the transient voltages through such shunt path to ground thereby precluding the transient voltages from actuating the telephone set to produce false ringing signals.

A feature of the invention resides in an R-C network connected between ground and a point common to the telephone set and transistor for functioning in the following manner. As the telephone set is operated to provide indications of its several states to the signaling conductor pair, the capacitor of the R-C network receives a voltage charge of predetermined magnitude; and as the telephone set is operated from its off-hook to on-hook state, the capacitor is discharged through the transistor, which is saturated at this time, to ground thereby maintaining the transistor saturated for a brief time interval after the telephone set is returned to its on-hook state. As a consequence of such continued transistor saturation, transient voltages resulting from the latter operation of the telephone set and applied to the signaling conductor pair are directly shunted therefrom and through the saturated transistor to ground. This precludes the latter transient voltages from actuating the telephone set to produce false ringing signals.

The present invention is readily understood from the following description taken together with the accompanying drawing which is a schematic circuit illustrating a telephone signaling system including a specific embodiment of the present invention.

A telephone signaling system disclosed in my copending application, Ser. No. 493,862, filed Oct. 7, 1965 comprises a customer's carrier frequency terminal in one geographical area and a central office terminal adapted to include carrier frequency equipment in a different geographical area interconnected by a two-wire signal transmission line 10 which transmits both voice and carrier frequency voltages in opposite directions at the same time. Inasmuch as the present invention explained hereinafter is related only to the carrier voltage feature disclosed in my copending application, supra, it is understood that the following description of this feature is limited to such detail as is necessary to enable a facile comprehension of the present invention.

At the customer's terminal a telephone set 11 includes a switch 12 in an open condition to indicate an on-hook state of the telephone set. This state involves an open series circuit comprising switch terminal T, winding 13 of a hybrid coil 14, operating winding 15 of electromagnetic relay 16, positive and negative terminals of a source 17 of direct current voltage, winding 18 of the hybrid coil and terminal R of switch 12. This circuit may be closed by closing switch 12 to represent an off-hook state of the telephone set and thereafter repeatedly interrupted by repeated alternate openings and closings of the switch to represent dial-pulsing operations of the switch. The telephone set also includes a ringer 19 which is actuable to produce predetermined ringing signals. These several states of the telephone set perform functions that are well-known to the art. A normally open contact 20 associated with the relay operating winding serves a purpose that is subsequently mentioned. A capacitor 28 connected across the adjacent ends of windings 13 and 18 completes the voice frequency circuit at the customer's terminal.

The hybrid coil also includes split windings 21 and 22 whose common point is grounded through resistor 23. A free end of winding 21 is connected to an input of voice-frequency amplifier 24 included in a transmitting path 25, and a free end of winding 22 is joined to an output of a voice-frequency amplifier 26 included in a receiving path 27. The positive terminal of the direct current source is connectable to and disconnectable from a common point 31 and thereby to a preselected contact 32 included in a frequency modulator 33 in the transmitting path for a purpose that is later mentioned. An input of amplifier 26 is connected to an output of a frequency-modulation detector 34 in the receiving path. The output of the frequency modulator and the input of the frequency-modulator detector are joined to a frequency-separation filter 35 which is also connected to the signaling transmission line 10.

At the central office terminal the signaling transmission line 10 is joined via frequency-separation filter 39 to an input of carrier-frequency amplifier 40 in receiving path 41 whose output is connected via frequency-modulation detector 41*a* and voice-frequency amplifier 42 to one end of winding 43 of a hybrid coil 44. Another end of winding 43 is connected to an adjacent end of winding 45. A common point of windings 43 and 45 is joined via R-C network 46 to ground. Filter 39 is also connected to an output of frequency modulator 47 included in a transmitting path 48 and having an input joined to an output of voice-frequency amplifier 49 whose input is connected to a free end of winding 45. Windings 51 and 52 of hybrid coil 44 have their outer ends connected to a supply 58 of direct current voltage included in main distributing frame 53, and their adjacent ends connected to one terminal of a parallel branch network 54 including a series resistor 55 and relay contact 56 in one branch and a capacitor 57 in the other branch. This contact serves to open and close a direct current circuit including the voltage supply and hybrid coil windings in a manner and for a purpose that are later mentioned. It is understood that the main distributing frame is shown herein in a simple form only for the purpose of simplifying this description, and includes other structure, not shown, but familiar to the telephone art.

A second output from carrier-frequency amplifier 40 is connected via series filter R-C network 60 to a midpoint of voltage-divider resistors 61 and 62 of which the outer end of resistor 61 is connected to ground and the outer end of resistor 62 to a supply 63 of direct current voltage of negative polarity. The midpoint of the voltage divider is connected to the base of a transistor 64 having its collector joined to ground via relay operating winding 65 shunted by a capacitor 66. The emitter of the transistor is connected through parallel R-C network 67 to the negative voltage supply 63. The association of relay contact 56 and relay operating winding 65 is indicated by broken line 68.

A ringing circuit at the customer's terminal comprises a low-pass filter 70 transmitting a preselected ringing voltage of 20 cycles per second, for example, to the base of a split-load transistor phase inverter 71 having its collector and emitter capacitively coupled to the bases of emitter followers 72 and 73, respectively, included in a ringing amplifier 74. This transistor base also receives its bias, not shown, from amplifier 26, and includes load resistors 71*a* and 71*b*. Terminal 78 is connected via a lead, not shown, to terminal 79 of voltage supply 17. This voltage and associated resistors R1, R2, R3 and R4 bias transistors 72 and 73 near to cut off. These emitters are connected to the bases of push-pull transistor stage 75, 76 and provide the bias for the latter bases. The collectors of this push-pull transistor stage are coupled via transformer 77 to ground and ring terminals G and R, respectively, of the telephone set. The emitters of this push-pull stage are connected via resistor 77*a* to ground. This resistor linearizes the operation of transistors 75 and 76.

It is understood that filter 70 derives the preselected 20-c.p.s. ringing voltage from receiving path 27 and applies it to the base electrode of the phase inverter and ringing amplifier substantially with minimum attenuation for actuating ringer 19 included in the telephone set to produce predetermined ringing signals, audible or visual as desired. At the same time this filter attenuates substantially entirely voice-frequency voltages whereby the latter voltages are precluded from actuating the telephone ringer to produce false ringing signals. It is also understood for the purpose of this description that the incoming 20-c.p.s. ringing voltage is supplied via the main distributing frame at the central office terminal in the well-known manner for completing a call incoming to the customer's terminal and originating with a distant telephone customer connected to the central office terminal in the familiar way.

The operation of the above-described circuit takes place in the following manner in the respect of an initiation of an outgoing call, for example, at a customer's terminal. It is therefore assumed at the moment that the circuit rests in a state of non-use in which the telephone set is in the on-hook state as switch 12 is now open. The calling party as the first step operates the telephone set to an off-hook state which means the lifting of the transmit-receiver handset from its cradle in one well-known type of telephone set. This closes switch 12 to complete an energizing circuit for relay operating winding 15 which thereupon closes its contact 20 to supply direct current voltage via common point 31 to frequency modulator 33. This voltage energizes the frequency modulator to transmit an unmodulated carrier voltage of preselected frequency via transmitting path 25 and through filter 35 to signaling transmission line 10.

This unmodulated carrier frequency voltage received from the signaling transmission line through filter 39, amplifier 40 in receiving path 41, and filter network 60 is rectified in amplifier-rectifier 64 to energize relay operating winding 65. This closes relay contact 56 to complete a direct current circuit including hybrid coil windings 51 and 52, resistor 55, and direct current voltage source 58. This indicates to the main distributing frame in the central office terminal that the telephone set at the customer's terminal is in the off-hook state and is ready to initiate an outgoing call by subsequently going into a dial-pulsing operational state. The central office terminal acknowledges the off-hook state by returning dial tone to the calling party at the customer's terminal in the manner pointed out in my copending application, supra.

The calling party at the customer's terminal as a second step proceeds with the dial-pulsing operation of the telephone set. This results in the alternate closing and opening of switch 12 a predetermined number of times to represent each digit of the distant number being called at the moment. This means that the aforedescribed series circuit including switch, hybrid coil windings 13 and 18, and voltage source 17 is closed and opened a number of times corresponding to the respective digits of the called number, and at the same time relay contact 20 is similarly closed and opened to apply direct current voltage via common terminal 31 to terminal 32 of frequency modulator 33. These discrete voltages render the frequency modulator alternately operative and inoperative to transmit a series of unmodulated 20-kc carrier frequency voltage pulses for each digit of the distant telephone number being called at the moment.

This series of unmodulated carrier voltage pulses received at the central office terminal and representing each digit of the distant telephone number being called is rectified for alternately energizing and deenergizing operating winding 65 whereby its associated contact 56 is correspondingly closed and opened to close and open similarly the series circuit including the latter contact and voltage source 58. These closings and openings of voltage source 58 are recognized as dial pulses by the central office terminal which thereupon proceeds to process the latter voltage interruptions for connecting the calling telephone set at the customer's terminal to the called telephone set of the distant party.

Further details regarding the structure and operation of the aforedescribed circuit shown in the drawing may be obtained by reference to my copending application, supra.

It was found in the operation of the circuit shown in the drawing as above described that the operations of switch 12 in the telephone set from the on-hook state to the off-hook state, in the dial-pulsing state, and back from the off-hook to the on-hook state to close and open the series circuit including switch 12, hybrid windings 13 and 18, and voltage source 17 caused the hybrid coil to introduce relatively large voltage transients into receiving path 27 at the customer's terminal in correspondence with the discrete direct current voltages applied from the same source via relay contact 20 and a common point 31 to the frequency modulator in transmitting path 25. These transient voltages coupled into the input of the ringing amplifier actuate the telephone set ringer to produce false predetermined ringing signals. It was also found that the dialing operation per se of the telephone set at the customer's terminal generated a voltage having a frequency of the order of 10 cycles per second. This voltage approximating the 20-c.p.s. ringing voltage in frequency also actuates the telephone set ringer to produce false predetermined ringing signals.

It was additionally found that the interruptions of the series circuit including hybrid windings 51 and 52, relay contact 56 and voltage supply 58 at the central office terminal in response to the discrete voltage pulses supplied at the customer's terminal and activating relay operating winding 65 at the central office terminal caused the hybrid coil 44 to introduce additional transient voltages into transmitting path 48 at the latter terminal. These additional transient voltages are transmitted by activating frequency modulator 47 in transmitting path 48 at the central office terminal and frequency-modulation detector 34 in receiving path 27 at the customer's terminal in the manner disclosed in my copending application, supra. Thereafter, the additional transient voltages energize ringing amplifier 74 at the customer's terminal for activating the telephone set to produce additional false predetermined ringing signals.

In accordance with a specific embodiment of the present invention, a circuit arrangement shown in heavy lines in the drawing is added to the above-described carrier-frequency signaling system for desensitizing the ringing amplifier included therein to preclude transient voltages occasioned by the several operations of the customer's telephone set as above identified from being transmitted through the ringing amplifier to actuate the telephone set ringer to produce false predetermined ringing signals. This circuit arrangement includes a lead 80 connecting common point 31 to an anode of unidirectional diode 81 whose cathode is connected via resistor 82 to a base electrode of a transistor 83 whose emitter is connected to ground. Diode 81 is thus poled in a direction toward the transistor base. The collector of this transistor is joined to the cathodes of diodes 84 and 85 whose anodes are connected to the base electrodes of emitter follower transistors 72 and 73, respectively, included in ringing amplifier 74. An R-C network 86 has one terminal connected to a point common to diode 81 and resistor 72, or the base electrode of transistor 83 if the latter resistor were removed from the circuit, and an opposite terminal to ground.

The operation of the ringing amplifier desensitizing arrangement just described takes place in the following manner with regard to the initiation of the outgoing call from the telephone set shown at the customer's terminal. It is assumed at the moment that the overall signaling circuit is resting in a state of non-use in which the telephone set is in the on-hook state as switch 12 thereof is now open. As a consequence of such on-hook state, contact 20 associated with relay operating winding 15 is open whereby zero voltage is effective at common point 31, terminal 32 of frequency modulator 33, and the base electrode of transistor 83, and at the same time an unregulated voltage of approximately 30 volts is applied to amplifier terminal 78 from terminal 79 of voltage source 17 for energizing the collectors of both emitter-follower transistors 72 and 73.

When the telephone set is initially operated to the off-hook state represented by the initial closure of switch 12, relay operating winding 15 is energized to close its associated contact 20 whereby positive 12 volts is simultaneously applied via common point 31 to frequency modulator 33 in transmitting path 25 and to lead 80 including diode 81, resistor 82 and the base electrode of transistor 83. At the same time, the positive voltage applied to amplifier terminal 78 is reduced from 30 volts to the order of 12 to 15 volts as telephone set current of about 30 milliamperes produces an IR drop in the corresponding power supply resistor, not shown. The positive voltage of 12 volts on lead 80 causes current of sufficient magnitude to flow in the base of transistor 83 to saturate the latter immediately. Resistor 82 limits the magnitude of such current flow. As this transistor is now saturated, its collector-to-emitter resistance is so very low that the above-identified transient voltages, as well as any other voltages derived from receiving path 27 and applied to the base electrodes of emitter-follower driver stage 72 and 73, are transmitted through a low-impedance shunt-path comprising forward biased diodes 84 and 85 and low-resistance transistor 83 to ground. It is thus apparent that afore-mentioned transient voltages having positive polarity and due to the operations of the telephone set from the on-hook state to the off-hook state, the dial operation per se and in the dial-pulsing state at the customer's terminal and the transient voltages due to the interruptions of the direct-current voltage at the central office terminal are transmitted through the shunt path including the saturated transistor to ground.

When the telephone set is operated from the off-hook state back to the on-hook state, the transient voltage due to this operation as above explained and derived from receiving path 27 are applied to the base electrodes of emitter-follower driver stage 72 and 73. At this time switch 12 and relay contact 20 are open for removing the positive 12-volt voltage from common point 31 and thereby from both the frequency modulator 33 and the base electrode of transistor 83. At this moment, however, the capacitor included in R-C network 86 and charged by the positive 12-volt voltage that was initially effective at common point 31 serves to apply its positive 12-volt voltage charge via the resistor included in the R-C network and resistor 82 to the base electrode of transistor 83. Diode 81 prevents discharge of the capacitor in R-C network 86 through the frequency modulator 33. This continues transistor 83 in saturation for a brief time interval after the telephone set is operated from the off-hook state to the on-hook state. The duration of this time interval depending on the time constant of the R-C network is sufficient to enable the transmission to ground through the shunt path including the saturated transistor the transient voltages derived from receiving path 27 and applied to the base electrodes of emitter-follower driver state 72 and 73 as the telephone set is operated from its off-hook state back to its on-hook state. This continuance of transistor 83 in saturation also transmits to ground at the cnstomer's terminal any transient voltage introduced by hybrid coil 44 into the transmitting path 48 and due to the last interruption of the direct current voltage including supply 58 thereat as the telephone set is operated from the off-hook state back to the on-hook state at the customer's terminal as just mentioned.

It is noted that diodes 84 and 85 provide the necessary electrical isolation between the base electrodes of emitter-follower driver stage 72 and 73 after the telephone set is restored to its on-hook state. It is also noted that when the telephone set is restored to its on-hook state, except for the brief time interval just discussed, transistor 83 provides a high-impedance path between the base electrodes of emitter-follower driver stage 72 and 73 and ground whereby ringing signal voltages derived from receiving path 27 and applied to the latter base electrodes are transmitted through amplifier 74 for actuating the telephone set ringer to produce desired ringing signals; and it is further noted that when the telephone set is operated to its off-hook and in its dial-pulsing state, transistor 83 provides a low-impedance path between the base electrodes of emitter-follower driver state 72 and 73 and ground whereby all transient voltages derived from receiving path 27 and applied to the base electrodes of emitter-follower driver stage 72 and 73 are transmitted directly from the latter base electrodes through low-impedance saturated transistor 83 to ground. This precludes such transient voltages from being amplified to activate the telephone set ringer to produce false ringing signals.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:

1. A telephone signaling system comprising:

a customer terminal;

a central office terminal;

and first and second signaling paths interconnecting said customer and central office terminals;

said customer terminal including:

a telephone set operable to on-hook, off-hook and dialing states and having a ringer;

first inductive means connecting said telephone set to said first and second paths;

and a first source of direct current voltage connectable through said first inductive means and telephone set to apply discrete positive direct current voltage signals to said first path when said telephone set is operated from said on-hook state to said off-hook and dialing states, whereby said first inductive means is caused to introduce first transient voltages into said second path;

said central office terminal including second inductive means connected to said first and second paths and activated by said positive voltage signals derived from said first path to intermittently apply another direct current voltage to said central office terminal for reproducing said last-mentioned voltage signals at said last-mentioned terminal, whereby said second inductive means is caused to introduce additional transient voltages into said second path; said second inductive means also applying preselected ringing voltages to said second path at desired time intervals;

said customer terminal also including:

an amplifier coupling said second path to said ringer and including at least two transistors, each having at least an emitter and a base; said emitters coupled to said ringer and said bases coupled to said second path; said amplifier activated by said preselected ringing voltages derived from said second path for actuating said ringer to produce predetermined ringing signals; said amplifier further activated by said first and additional transient voltages derived from said second path for further actuating said ringer to produce false predetermined ringing signals;

and means to desensitize said amplifier to said first and additional transient voltages for preventing the production of said false ringing signals, comprising a third transistor having a collector connected to said amplifier transistor bases, an emitter connected to ground, and a base connectable to and disconnectable from a positive terminal of said first voltage source under control of said telephone set; said third transistor base disconnected from said last-mentioned terminal to cut off saturation in said third transistor when said telephone set is in on-hook state; said third transistor base connected to said last-mentioned positive terminal and energized by the voltage thereat to provide saturation in said third transistor for transmitting therethrough to ground said first and additional transient voltages derived from said second path as said telephone set is being operated from said on-hook state to said off-hook and dialing states.

2. The signaling system according to claim 1 in which said customer terminal also includes:

a resistor-capacitor network having one terminal connected to said third transistor base and a second terminal connected to ground; said network one terminal disconnectable from and connectable to said positive terminal in synchronism with said third transistor base disconnection from and connection to said last-mentioned terminal, respectively;

and a diode having a cathode connected to a point common to said third transistor base and said network one terminal and an anode connectable to and disconnectable from said positive terminal;

said network capacitor being provided with a voltage charge when said third transistor base and said network one terminal are connected to said positive terminal as said telephone set is operated from said on-hook state to said off-hook and dialing states and said network capacitor charge being discharged through said base and emitter of said third transistor in saturation to ground for maintaining said third transistor in saturation a predetermined time interval after said telephone set is operated from said off-hook state to said on-hook state to transmit through said third transistor in saturation to ground further transient voltages derived from said second path as said telephone set is being operated from said off-hook state to said on-hook state.

3. The signaling system according to claim 2 which includes a resistor connected between said third transistor base and said common point for limiting the amount of current flow in said last-mentioned base.

4. The signaling system according to claim 3 which includes second and third diodes, each including a cathode and an anode, each of said last-mentioned anodes connected to one of said amplifier transistor bases and said last-mentioned cathodes connected to said third transistor collector; said second and third diodes forward biased to transmit said first and additional transient voltages from said amplifier transistor bases to ground when said third transistor is in saturation; said second and third diodes providing electrical isolation between said amplifier transistor bases when saturation in said third transistor is cut off.

5. A telephone signaling system including:

a customer terminal comprising:

a telephone set operable to on-hook, off-hook and dialing states and having a ringer;

a transmitting signaling path;

a receiving signaling path;

inductive means interconnecting said telephone set and transmitting and receiving paths;

a source of direct current voltage connectable through said inductive means and said telephone set to apply discrete positive direct current voltages to said transmitting path as said telephone set is operated from said on-hook state to said off-hook and dialing states, whereby said inductive means is caused to introduce transient voltages into said receiving path;

an amplifier including at least two transistors, each having at least a base and an emitter; said bases coupled to said receiving path and said emitters coupled to said ringer; said amplifier energized by a preselected ringing signal voltage derived from said receiving path at a desired time interval for actuating said ringer to provide a predetermined ringing signal; said amplifier further energized by said transient voltages derived from said receiving path for actuating said ringer to provide a false predetermined ringing signal;

and means for desensitizing said amplifier to said transient voltages, comprising:

a pair of diodes, each having an anode connected to one of said amplifier transistor bases and a cathode connected to a common point;

and a third transistor having a collector connected to said common point, an emitter connected to ground and a base connectable to and disconnectable from a positive terminal of said voltage source under control of said telephone set; said third transistor base disconnected from said positive terminal to cut off saturation in said third transistor when said telephone set is in said on-hook state; said third transistor base connected to said positive terminal and energized by the voltage thereat to provide saturation in said third transistor for transmitting therethrough to ground said transient voltages derived from said receiving path as said telephone set is being operated from said on-hook state to said off-hook and dialing states.

6. The signaling system according to claim 5 in which said customer terminal also includes:

said telephone set being operated from said off-hook state to said on-hook state, whereby said inductive means is caused to introduce further transient voltages into said receiving path;

said amplifier being energized by said further transient voltages derived from said receiving path for actuating said ringer to produce an additional false predetermined ringing signal;

and said desensitizing means also comprising:

a third diode poled in a current flow direction toward said third transistor base; said third diode and said third transistor base connectable serially to and disconnectable from said positive terminal under control of said telephone set;

and a resistor and a capacitor connected in series; said resistor having a terminal connected to a point common to said third diode and said third transistor base and said capacitor having a terminal connected to ground, whereby said capacitor is provided with a voltage charge when said third diode and said third transistor base are serially connected to said positive terminal as said telephone set is operated from said on-hook state to said off-hook and dialing states and said capacitor voltage charge is discharged through said base and emitter of said third transistor in saturation to ground for maintaining said third transistor in saturation a predetermined time interval after said telephone set is operated from said off-hook state to said on-hook state to disconnect said third diode and said third transistor base from said positive terminal for transmitting through said third transistor in saturation to ground said further transient voltages derived from said receiving path as said telephone set is being operated from said off-hook state to said on-hook state.

7. The signaling system according to claim 6 which includes a central office terminal comprising second inductive means connected to said transmitting and receiving paths and activated by said discrete voltages derived from said transmitting path to intermittently apply a second direct current voltage to said central office terminal in correspondence with said last-mentioned discrete voltages for reproducing said last-mentioned discrete voltages in said central office terminal, whereby said last-mentioned inductive means is caused to introduce additional transient voltages into said receiving path;

said customer terminal including said third transistor in saturation for also transmitting therethrough to ground said additional transient voltages derived from said receiving path at said customer terminal.

8. A signaling system comprising:

first and second signaling terminals geographically spaced from each other;

first and second signaling paths interconnecting said terminals;

first inductive telephone signaling means connected to said first and second signaling paths at said first terminal and operable from an on-hook state to off-hook and dialing states to repetitively open and close a first direct current voltage circuit for applying discrete direct current voltage pulses to said first path and at the same time introducing first transient voltages into said second path;

second inductive telephone signaling means connected to said first and second paths at said second terminal and activated by said discrete voltage pulses derived from said first path at said second terminal to interrupt an additional direct current voltage circuit at said second terminal in correspondence with said last-mentioned discrete voltage pulses for reproducing said last-mentioned discrete voltage pulses at said second terminal and at the same time introducing second transient voltages into said second path; said second signaling means also applying preselected ringing voltages to said second path at said second terminal at desired time intervals;

amplifying means included in said first terminal and having an input coupled to said second path and an output coupled to said first signaling means; said amplifying means energized by said preselected ringing voltages derived from said second path at said first terminal for activating said first signaling means to produce desired predetermined ringing signals; said amplifying means also energized by said first and second transient voltages derived from said second path at said first terminal for activating said first signaling means to produce false predetermined ringing signals;

and means included in said first terminal for desensitizing said amplifying means to said first and second transient voltages, comprising a transistor having a collector connected to said amplifying means input, an emitter connected to ground and a base connectable to and disconnectable from a voltage terminal of preselected polarity in said first voltage circuit; said transistor base disconnected from said preselected polarity voltage terminal when said first signaling means is operated to an on-hook state to allow said first voltage circuit to remain in an open condition for cutting off saturation in said transistor whereby a high impedance circuit is established from said amplifying means input to ground to block the transmission of said preselected ringing voltages to ground while said first signaling means is in said on-hook state; said transistor base connected to said preselected polarity voltage terminal when said first signaling means is operated from said on-hook state to said off-hook and dialing states for receiving other discrete voltage pulses obtained from said first voltage circuit and synchronized with said first-mentioned voltage pulses to activate said transistor into saturation whereby a low impedance circuit is established from said amplifying means input to ground to transmit through said last-mentioned low impedance circuit to ground said first and second transient voltages derived from said amplifying means input.

9. The signaling system according to claim 8 in which:

said amplifying means includes at least second and third transistors, each including at least a base and an emitter; said last-mentioned bases constituting said amplifying means input coupled to said second path and said last-mentioned emitters constituting said amplifying means output coupled to said first signaling means;

and said desensitizing means includes a pair of diodes, each including an anode and a cathode, each of said anodes connected to one of said second and third transistor bases in said amplifying means input and both of said cathodes included in said amplifying means input and connected to said first-mentioned transistor collector.

10. A signaling system including:

a signaling terminal comprising:

a first signaling path;

a second signaling path;

signaling means;

inductive means connecting said signaling means to said first and second paths to transmit discrete direct current voltage pulses originating in said signaling means at a selected time interval to said first path whereby said inductive means is caused to introduce transient voltage into said second path;

amplifying means having an input connected to said second path and an output to said signaling means; said amplifying means energized by a preselected ringing voltage obtained from said second path at a desired time interval for activating said signaling means to produce a predetermined ringing signal; said amplifying means further energized by said transient voltage obtained from said second path for activating said signaling means to produce a false predetermined ringing signal;

and variable impedance means connecting said amplifying means input to ground for rendering said transient voltage obtained from said second path ineffective to activate said signaling means; said variable impedance means normally having high impedance to ground to block therethrough to ground the transmission of said preselected ringing voltage obtained from said second path and applied to said amplifying means input at said desired time interval; said variable impedance means activated to low impedance to ground in response to other discrete direct current voltage pulses originating in said signaling means in synchronism with said first-mentioned direct current voltage pulses to transmit through said low impedance of said variable impedance means to ground said transient voltage obtained from said second path and applied to said amplifying means input at said selected time interval.

11. The signaling system according to claim 10 which includes:

a second signaling terminal geographically spaced from said first signaling terminal and comprising second inductive means connected to said first and second signaling paths and activated by said discrete positive direct current voltage pulses derived from said first path at said second terminal to intermittently apply a second direct current voltage to said second terminal in synchronism with said last-mentioned pulses for reproducing said last-mentioned pulses in said second terminal at said selected time interval, whereby said second inductive means is caused to introduce an additional transient voltage into said second path;

said amplifying means additionally energized by said additional transient voltage obtained from said second path at said first terminal for activating said signaling means to produce an additional false predetermined ringing signal;

said additional transient voltage obtained from said second path and applied to said amplifying means input at said first terminal transmitted through said low impedance of said variable impedance means to ground for precluding the activation of said signaling means by said last mentioned transient voltage to produce said additional predetermined false ringing signal.

12. A signaling system comprising:

first and second signaling terminals geographically spaced from each other;

first and second signaling transmission paths interconnecting said terminals;

first inductive signaling means connected to said first and second paths in said first terminal to apply discrete direct current voltage signals originating in said signaling means at a selected time interval to said first path, whereby said first signaling means is caused to introduce first transient voltages into said second path;

second inductive signaling means connected to said signals for reproducing said last-mentioned signals first and second paths in said second terminal and activated by said discrete direct current voltage signals derived from said first path to intermittently apply another direct current voltage to said second terminal in synchronism with said last-mentioned in said second terminal at said selected time interval, whereby said second signaling means is caused to introduce additional transient voltages into said second path; said last-mentioned signaling means also applying a preselected ringing voltage to said second path at a desired time interval;

amplifying means included in said first terminal and having an input connected to said second path and an output connected to said first signaling means; said amplifying means energized by said preselected ringing voltage derived from said second path at said first terminal for activating said first signaling means to produce a predetermined ringing signal; said amplifying means further energized by said first and additional transient voltages derived from said second path at said first terminal for further activating said signaling means to produce a false predetermined ringing signal;

and variable impedance means included in said first terminal to connect said amplifying means input to ground for desensitizing said amplifying means to said first and additional transient voltages; said impedance means having a low impedance to ground established therein in response to other discrete direct current voltage signals obtained from said first signaling means and synchronized with said first-mentioned discrete direct current voltage signals for transmitting said first and additional transient voltages to ground at said selected time interval to preclude the energization of said amplifying means by said last-mentioned voltages to activate said signaling means to produce said false ringing signal; said impedance means normally having high impedance to ground at said desired time interval to block therethrough to ground the transmission of said preselected ringing voltage derived from said second path at said first terminal and applied to said amplifying means input thereat.

References Cited

UNITED STATES PATENTS 3,284,576 11/1966 York.

KATHLEEN H. CLAFFY, Primary Examiner

W. A. HELVESTINE, Assistant Examiner